(12) United States Patent
Burton (10) Patent No.: US 9,140,294 B2
(45) Date of Patent: Sep. 22, 2015

(54) HIGH EXTRACTION FORCE BALL SOCKET

(71) Applicant: Burton Technologies, LLC, Ludington, MI (US)

(72) Inventor: John E. Burton, Ludington, MI (US)

(73) Assignee: Burton Technologies, LLC, Ludington, MI (US)

(*) Notice: Subject to any disclaimer, the term of this patent is extended or adjusted under 35 U.S.C. 154(b) by 0 days.

(21) Appl. No.: 13/778,351

(22) Filed: Feb. 27, 2013

(65) Prior Publication Data

US 2013/0236238 A1 Sep. 12, 2013

Related U.S. Application Data

(60) Provisional application No. 61/607,117, filed on Mar. 6, 2012.

(51) Int. Cl.
| F16C 11/00 | (2006.01) |
| F16C 11/06 | (2006.01) |
| B60Q 1/068 | (2006.01) |
| F21S 8/10 | (2006.01) |
| F21V 21/29 | (2006.01) |

(52) U.S. Cl.
CPC .............. *F16C 11/06* (2013.01); *B60Q 1/068* (2013.01); *F16C 11/069* (2013.01); *F16C 11/0657* (2013.01); *F21S 48/1305* (2013.01); *B60Q 2200/32* (2013.01); *F16C 2208/66* (2013.01); *F16C 2226/74* (2013.01); *F16C 2326/01* (2013.01); *F16C 2362/00* (2013.01); *F21V 21/29* (2013.01); *Y10T 403/32737* (2015.01)

(58) Field of Classification Search
CPC .... F16C 11/06; F16C 11/0657; F16C 11/069; F16C 2226/74; F16C 2362/00; F16C 2326/01; F16C 2208/66; B60Q 1/068; B60Q 2200/32
USPC ............ 403/76, 77, 122, 124–126, 133, 135; 362/515, 528
See application file for complete search history.

(56) References Cited

U.S. PATENT DOCUMENTS

| 2,748,412 | A | * | 6/1956 | Peterson ........................ 401/283 |
| 2,910,260 | A | * | 10/1959 | Tanner ........................ 248/181.1 |
| 3,856,423 | A | * | 12/1974 | Uchida ........................ 403/140 |
| 4,102,585 | A | * | 7/1978 | Herbenar ........................ 403/138 |
| 4,430,016 | A | * | 2/1984 | Matsuoka et al. .............. 403/40 |
| 4,689,725 | A | | 8/1987 | Saijo et al. |
| 5,186,531 | A | | 2/1993 | Ryder et al. |
| 5,360,282 | A | | 11/1994 | Nagengast et al. |
| 5,443,323 | A | | 8/1995 | Prelat et al. |
| 5,630,672 | A | * | 5/1997 | Mc Hale ........................ 403/135 |
| 5,653,548 | A | * | 8/1997 | Amdahl ........................ 403/133 |
| 5,707,133 | A | | 1/1998 | Burton |
| 5,833,347 | A | * | 11/1998 | Nakamura et al. ............ 362/507 |
| 5,915,831 | A | * | 6/1999 | Bonin et al. .................. 362/519 |
| 6,113,301 | A | | 9/2000 | Burton |
| 6,171,012 | B1 | * | 1/2001 | Westphal ...................... 403/137 |

(Continued)

OTHER PUBLICATIONS

2003 Ford Socket Drawings.

*Primary Examiner* — Joshua Kennedy
(74) *Attorney, Agent, or Firm* — Brian G. Gilpin; Godfrey & Kahn, S.C.

(57) ABSTRACT

A ball socket for connection with a ball stud resists accidental pull-out of the ball stud. The ball socket achieves relatively low insertion force but relatively high pull-out force resistance.

1 Claim, 6 Drawing Sheets

(56) References Cited

U.S. PATENT DOCUMENTS

| | | |
|---|---|---|
| 6,247,868 B1 | 6/2001 | Burton |
| 6,758,622 B2 | 7/2004 | Burton |
| 6,837,716 B1 * | 1/2005 | Brazas ............................. 439/8 |
| 6,976,773 B2 * | 12/2005 | Cavanna ....................... 362/515 |
| 7,845,837 B2 | 12/2010 | Burton |
| 2012/0282015 A1 * | 11/2012 | Ersoy et al. .................. 403/133 |

* cited by examiner

HIGH EXTRACTION FORCE BALL SOCKET

CROSS-REFERENCE TO RELATED APPLICATION

This application is based on and claims priority to U.S. Provisional Patent Application No. 61/607,117 filed on Mar. 6, 2012, the disclosure of which is incorporated herein by reference in its entirety for all purposes.

FIELD OF THE INVENTION

The present invention relates generally to the field of pivot joints and has been found particularly useful as a pivot joint for connecting a headlamp adjuster to a reflector inside a headlamp assembly or an external reflector and lens headlamp assembly.

BACKGROUND OF THE INVENTION

Pivotable spherical joints, commonly referred to as ball joints, generally include a ball stud engaged in a socket. Such joints have a wide variety of applications where a pivotable connection between two parts is desirable. For example, they may be used in many types of linear actuators and have been found to be particularly useful in automotive lamp assemblies. As seen in U.S. Pat. No. 5,707,133 the disclosure of which is incorporated herein by reference, automotive lamp assemblies used as headlights typically comprise several basic parts: a support frame, a reflector, a lens, a bulb, and one or more adjusters.

In the automotive lamp assembly example, the support frame houses the reflector and the bulb on a pivotable mounting to allow the aim of the light to be adjusted using the adjuster. The lens seals the front of the assembly to protect it from the elements assailing the front end of the vehicle and provides an aerodynamic shape and attractive appearance. Typically, the reflector mounts inside the housing on one fixed ball joint and is adjustable horizontally and vertically using adjusters that interface with the reflector through moving ball joints. The moving ball joints are movable by actuating the adjusters connected to the moving ball joints by a ball stud having a head and a shaft. Another type of automotive headlamp assembly that uses linear actuators is shown in U.S. Pat. No. 5,360,282. In this type of headlamp assembly the linear actuator is mounted to a bracket and the ball joint end supports a reflector, lens and light bulbs. This type of application requires a higher strength ball joint due to the additional weight being supported. In particular, pull-out strength of the ball joint needs to be greater to withstand vibration.

While one possible application of the present invention is in headlamp assemblies, other applications are possible and references to use in a headlamp assembly should not be deemed to limit the application of the present invention. Additionally, while the improved ball socket design described herein may be designed for use with a disengageable ball stud, such as those described in U.S. Pat. Nos. 6,113,301; 6,247,868; and 6,758,622, the disclosures of which are incorporated by reference, it can also be used advantageously with ball studs having "ears" or engaging tabs or semi-spherical ball stud designs. Examples of such adjusters are disclosed in U.S. Pat. Nos. 4,689,725; 5,186,531; and 6,758,622. One additional benefit of the ball joint of the present invention is that it eliminates the variances associated with using semi-spherical ball studs, resulting in consistent pull out resistance.

Conventional ball joints for use in automotive lamp assemblies typically include a ball stud with a spherical engagement head extending from an adjuster. The ball stud is movable linearly in and out of the adjuster. While generally effective, there are a number of shortcomings to using a ball stud in a conventional socket that includes a plurality of resilient tabs to retain the ball stud. One such shortcoming is that the tabs typically contact the ball stud sphere up to or on a "tangent point" that is on an imaginary line between the pivot center of the ball stud and the center of the resilient tab, e.g., the configuration shown in U.S. Pat. No. 6,758,622. This configuration causes the force generated when the stud is subjected to pull-out force, to be directed along the imaginary line. This configuration results in a condition where the ball stud may be pulled out of socket under certain conditions of operation, such as vibration while supporting heavier reflectors or in heavier headlamp assemblies like the one previously referenced in U.S. Pat. No. 5,360,282, leaving the adjuster non-operational. This unexpected pull-out generally occurs because the retention tabs are necessarily flexible to allow the head to be installed in the socket. Though pull-out of the ball stud is resisted to some degree of success, if enough pull-out force is applied, the tabs deflect and the ball stud head slips through and "pops out." Reducing the flexibility of tabs is not a desirable option because it would either be too difficult to insert the ball stud head into socket, or the elasticity of the tabs would be lessened to the degree that they would break off during insertion of the ball stud.

While steel ball studs, particularly those with an undercut behind the head of the ball stud or ears that engage tabs or other structure can achieve high pull-out force resistance, it is often preferred to use a plastic ball stud to enable the use of more compact and lighter weight adjuster designs. Further, plastic ball studs can be designed that have undercuts behind the heads, tabs or other retaining structure, but for manufacturing, installation, and design flexibility, a full round ball stud head is generally preferred.

Accordingly, the need exists for an improved ball socket that securely retains a ball stud placed therein, can be effectively used in connection with disengageable or conventional ball studs, can be effectively used with plastic ball studs, is cost effective, and has greater resistance to accidental pull-out.

SUMMARY OF THE INVENTION

The present invention relates to an improved ball joint which includes resilient tabs that contact an inserted ball stud at a location toward the shank of the ball stud from the previously described tangent point. Certain embodiments of a ball joint in accordance with the present invention are capable of being used in automotive lamp assemblies and solve some or all of the problems raised or not solved by existing ball joints. Of course, the present invention may be used in a multitude of non-automotive lamp situations where similar performance capabilities are required.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

FIGS. 1-7 show one embodiment of a ball-socket 100 in accordance with the invention. The ball-socket 100 has a socket 110 and a ball stud 120. The ball stud 120 includes a spherical portion 122 and a shank 124. The socket 110 includes a plurality of resilient tabs 130 and a plurality of support legs 140. The resilient tabs 130 and support legs are attached to an exterior collar 160. Together, the resilient tabs 130 and support legs 140 combine to form a cavity 150 in which the ball stud 120 may pivot and rotate. The resilient tabs 130 elastically deform when the ball stud 120 is inserted into the socket 110. In the embodiment shown in FIGS. 1-7, the socket 110 is secured to its desired location via a screw 165.

Figure 1:
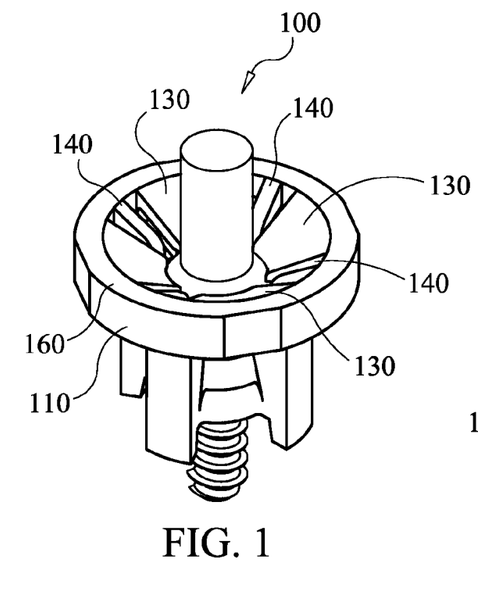
FIG. 1 is a perspective view of one embodiment of a ball-socket in accordance with the present invention, shown with a ball stud and a socket mounting screw.
Figure 2:
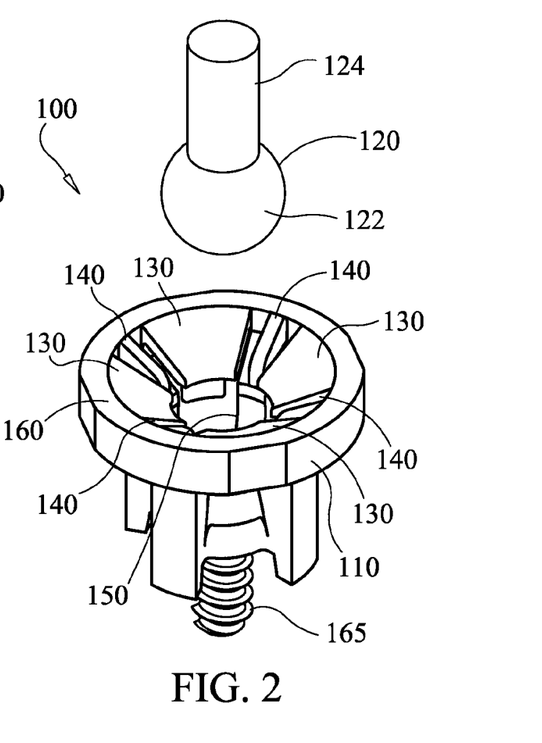
FIG. 2 is another perspective view of the ball-socket of FIG. 1, shown with the ball stud (not inserted) and a socket mounting screw.
Figure 3:
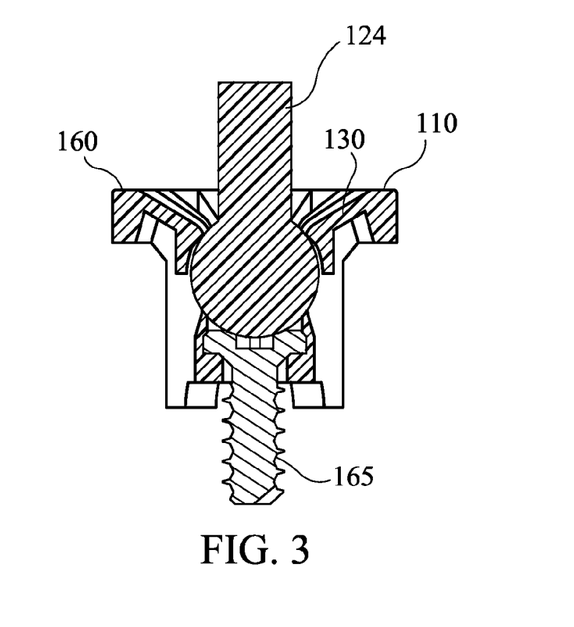
FIG. 3 is a section view of the ball-socket of FIG. 1.

FIG. 3 shows a cross-section of the ball-socket 100. When a pull-out force is applied to the ball-stud 120, it contacts resilient tabs 130 causing a portion of the pull-out force to be transferred through the resilient tabs 130 to the exterior collar 160. In the embodiment shown, the exterior collar 160 has a generally uniform and circular rim shape that withstands significant radial force without significant deflection. Other shapes could be used for the exterior collar 160 without departing from the invention.

Figure 4:
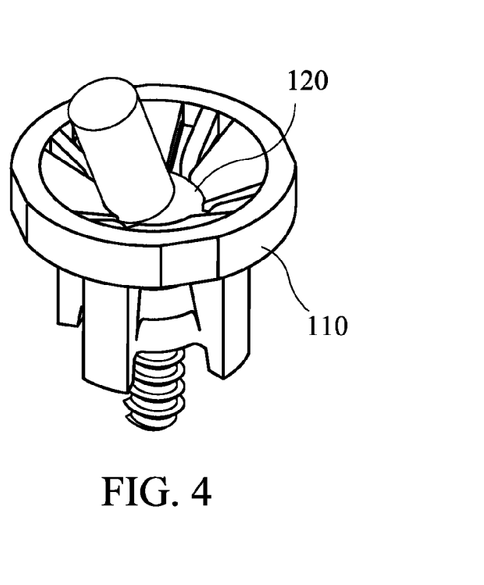
FIG. 4 is another perspective view of the ball-socket of FIG. 1, shown with the ball stud in a pivoted position.

FIG. 4 is another perspective view of the ball-socket 100 showing the ball stud 120 in a pivoted orientation. As should be apparent, the ball stud 120 may pivot and rotate within the ball-socket 100.

Figure 5:
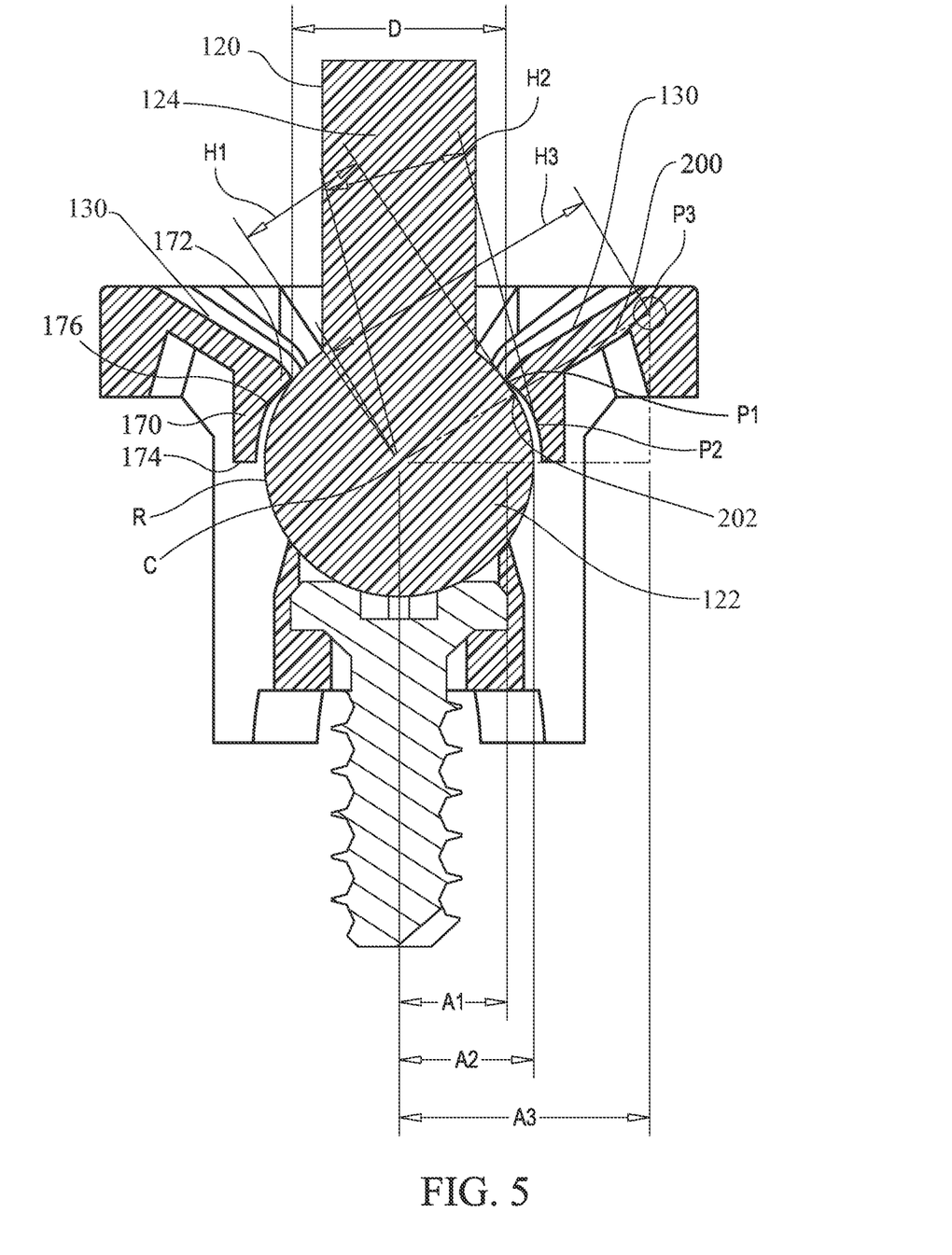
FIG. 5 is another section view of the ball-socket of FIG. 1.
Figure 5A:
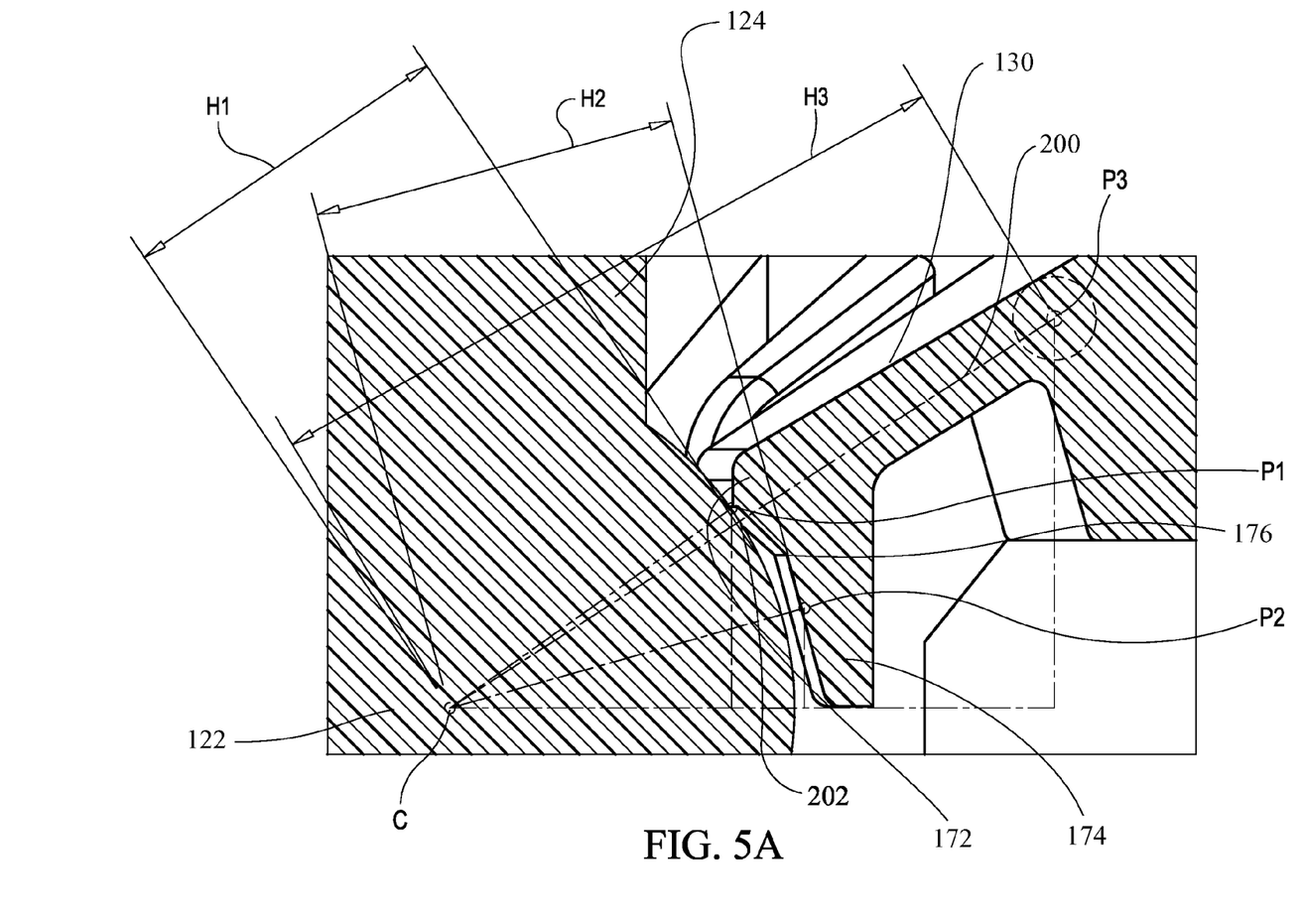
FIG. 5A is a detail view of a portion of the section view of FIG. 5.

FIGS. 5 and 5A are helpful in explaining the geometry that provides the improved pull-out force resistance while maintaining lower push-in force. FIG. 5 is a cross-section view of the ball-socket 100 and FIG. 5A is a detail view of FIG. 5 showing the points of contact between one of the resilient tabs 130 and the ball stud 120. The spherical portion 122 of the ball stud 120 has a center point C and a radius R. The resilient tabs 130 form an inner diameter D that is larger than the diameter of the shank 124 and smaller than the diameter of the spherical portion 122. A theoretical line 200 is shown that runs from the center point C to the fulcrum center point ("P3") of the resilient tab 130. A theoretical tangent point 202 is shown where the theoretical line 200 intersects the outer edge of the spherical portion 122 of the ball stud 120. As shown, the resilient tabs 130 contact the spherical portion 122 of the ball stud 120 at an upper point of contact P1. When a pull-out force is applied to the ball stud 120, a portion of the force is directed to the resilient tabs 130 along a line from the center of the spherical portion of the ball stud 120 to the upper point of contact P1 rather than along theoretical line 200.

The resilient tabs 130 further include a journal area 170 that is positioned to contact the ball stud 120 below the aforementioned theoretical tangent point 202 while the ball-socket 100 is in normal operation, e.g. when a pull-out force is applied to the ball stud 120. The journal area 170 has a short leg 172 that contacts the spherical portion 122 on the shank side of the theoretical-tangent point 202 and a long leg 174 that extends down spherical portion 122 on the other side of the theoretical tangent point 202. In between the short leg 172 and long leg 174 is a transition surface 176. Both the long leg 174 and the transition surface 176 are shown having some clearance from the spherical portion 122 but could also closely follow the contour of spherical portion. For ease of manufacturing due to the looser tolerances that could be used, having some clearance is believed to be advantageous. Additionally, having a clearance between the journal area 170 and the ball stud 120 allows the inner diameter D to decrease and tighten around the ball stud when the ball stud is under pullout load.

When a pull-out force is applied to the ball stud 120, the journal area 170 comes into contact with the spherical portion 122, thereby resisting the bending deformation of the resilient tabs 130. In addition to contacting the spherical portion 122 at upper point of contact P1, the long leg 174 contacts the spherical portion at a lower point of contact P2. When determining the size and shape of the resilient tabs 130, it is useful to measure the distance from the center point C to each of the contact points P1 and P2 and fulcrum center point P3. Each distance is shown in FIGS. 5 and 5a as H1, H2, and H3 respectively. Similarly, the horizontal distance from the center point C to the contact points P1 and P2 and fulcrum center point P3 are shown in FIG. 5 as A1, A2, and A3 respectively. The transition surface 176 does not contact the spherical portion 122 of the ball stud 120 ensuring that all of the pull out force is transferred to the resilient tabs 130 through the aforementioned contact points.

The trigonometric relationships between the distances described above allow the ball stud 120 to exhibit exemplary pull-out resistance, while simultaneously allowing insertion of the ball stud comparatively with little effort. To achieve these properties, distance H1 is approximately equal to radius R. H2, meanwhile, is greater than or equal to H1. The greater the difference between H2 and H1 allows for an exterior collar 160 that may be less resilient. The ratio of H1/A1 is greater than or equal to H3/A3. Finally, H3/A3 is greater than H2/A2.

Figure 6:
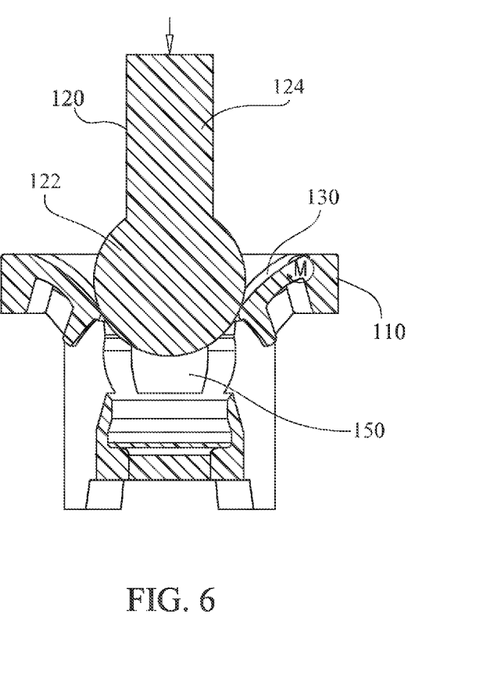
FIG. 6 is a section view of the ball-socket of FIG. 1, shown at the moment the ball stud is inserted into the ball-socket to illustrate the bending moment applied to the ball-socket.
Figure 7:
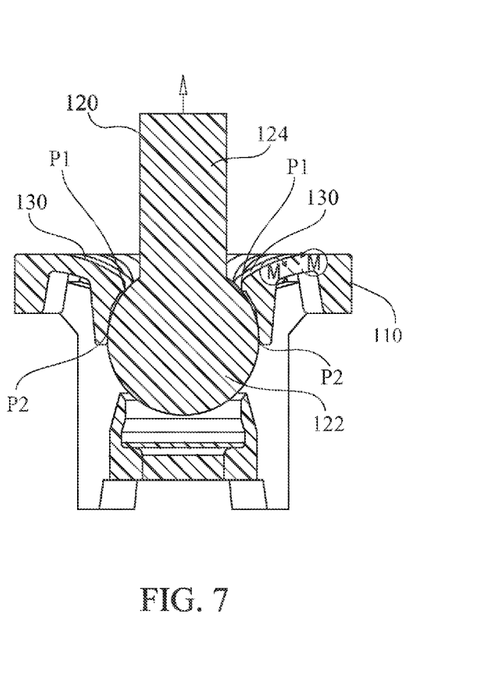
FIG. 7 is another section view of the ball-socket of FIG. 1, shown at the moment a pull-out force is applied to the ball stud to illustrate the bending moments applied to the ball-socket.
Figure 8A:
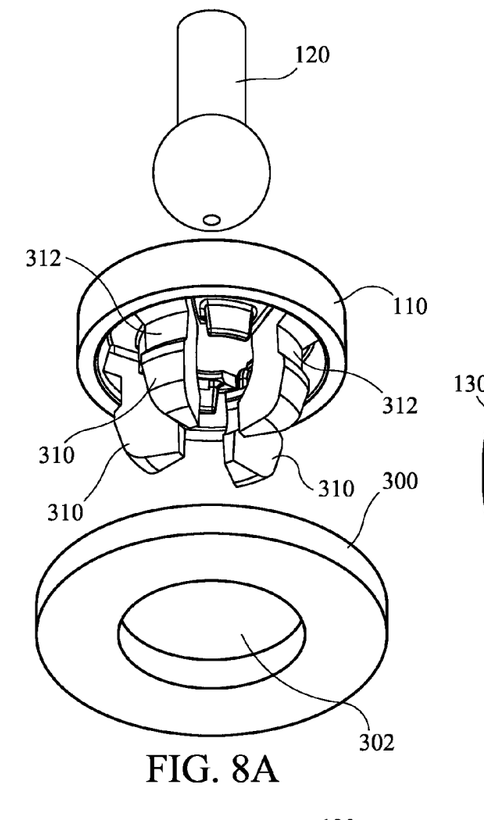
FIG. 8A is an bottom perspective view of another embodiment of a ball-socket in accordance with the invention, shown removed from a base material and with a ball stud (not inserted)
Figure 8B:
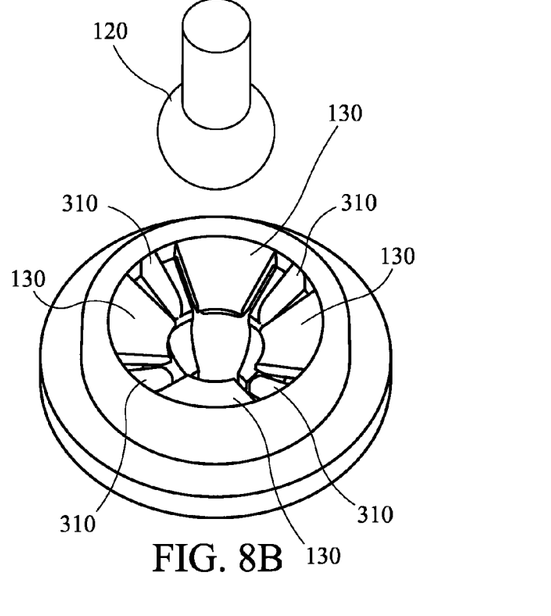
FIG. 8B is a top perspective view of the ball-socket of FIG. 8A, shown inserted into the base material and with a ball stud (not inserted)
Figure 8C:
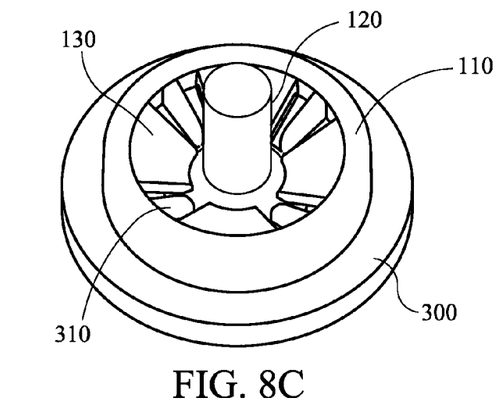
FIG. 8C is another top perspective view of the ball-socket of FIG. 8A, shown inserted into the base material and with a ball stud (inserted)
Figure 8D:
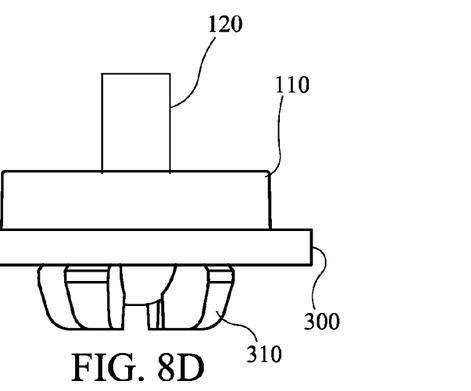
FIG. 8D is a side view of the ball-socket of FIG. 8A, shown inserted into the base material and with a ball stud (inserted)
Figure 9A:
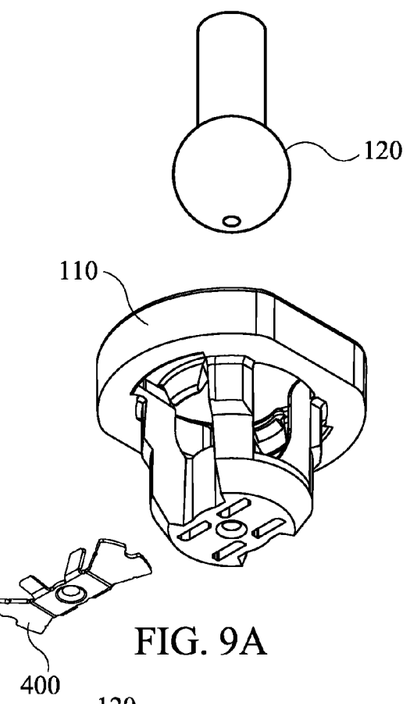
FIG. 9A is a bottom perspective view of another embodiment of a ball-socket in accordance with the invention, shown with a ball stud (not inserted)
Figure 9B:
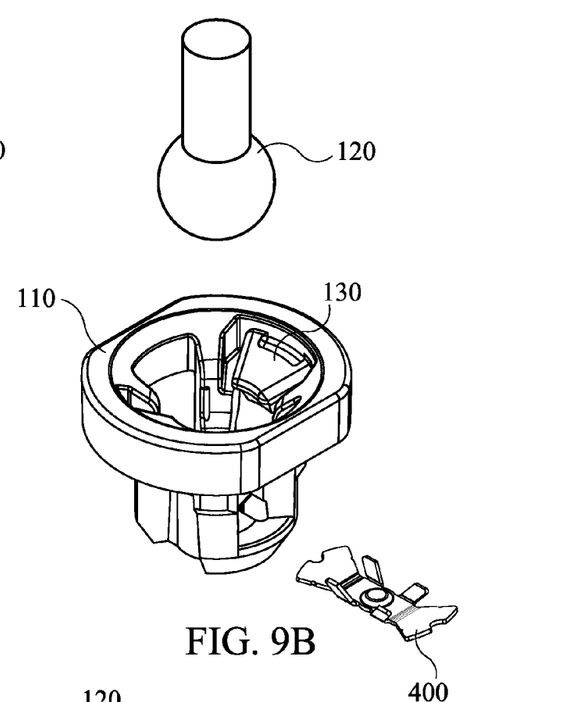
FIG. 9B is a top perspective view of the ball-socket of FIG. 9A, shown with a ball stud (not inserted)
Figure 9C:
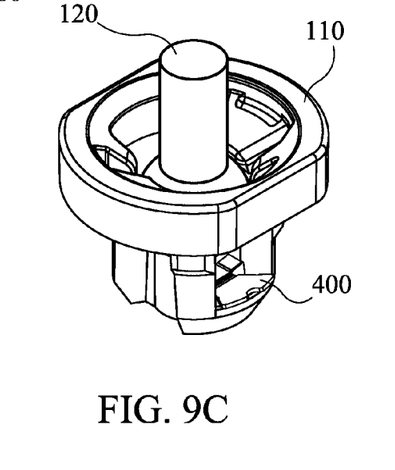
FIG. 9C is another top perspective view of the ball-socket of FIG. 9A, shown with a ball stud (inserted)
Figure 9D:
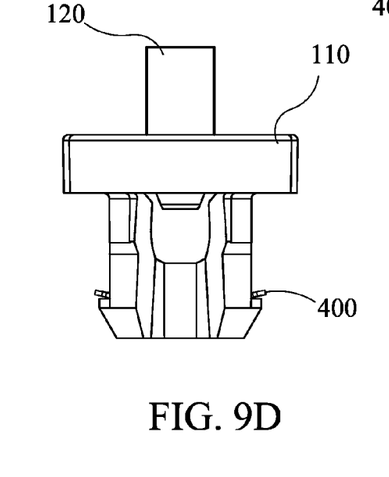
FIG. 9D is a side view of the ball-socket of FIG. 9A, shown with a ball stud (inserted).

The configuration of the ball-socket 100 is also such that when a pull-out three is applied to the ball stud 120, the force is not directed along the tangent line as in prior art ball-sockets. Rather, the force is applied to the resilient tabs 130 along lines finning from center point C to upper contact point P1 and lower contact point P2, thereby reducing the moment force directly applied to the base of the resilient tab 130 and creating dual moment threes. FIGS. 6 and 7 show the bending moments generated during insertion of the ball stud 120 and when the ball stud is subjected to pull out force.

As shown in FIG. 6, when the ball stud 120 is inserted into the ball-socket 100, only a single bending moment force (indicated by arrow M) is applied at the base of the resilient tabs 130. The single bending moment and free rotation of the resilient tabs 130 results in easy insertion of the ball stud 120 into the socket 110.

FIG. 7 shows the socket 110 under load. The resilient tabs 130 deform in an arcuate shape, with the section between the journal area 170 and the collar 160 deforming upwardly in the general direction of the shank 124. Such arcuate deformation occurs under pull-out loads significantly higher than those experienced during normal operation and during extreme vibration shock load. The base of the resilient tabs 130 bend in the direction of the pull out force because the short leg 162 contacts toward the shank 124 from the tangent point 202. However, the long leg 164 contacts toward the spherical portion 122 from the tangent point 202 and arrests this bending rotation. The end result is a double bend within the resilient tab 130 and the arc shaped deformation that greater resists pull out. Such a configuration places the resilient tabs not only in compression, as in the prior art, but also a double bending rotational moment that greater resists pull out (see double moment forces indicated by arrows M in FIG. 7), thereby allowing the socket 110 to resist failure until much higher loads than prior art ball-sockets. In the embodiment shown, material strength, resilient tab 130 and exterior collar 160 thickness are the primary determining factors for pull out. Frictional variance between the ball stud 120 and the socket 110 are essentially eliminated as a factor because as the resilient tabs 130 deform, the inner diameter D reduces and closes in behind the spherical portion 122 preventing slip-through and requiring that the resilient tabs 130 fail in order to remove the ball stud 120.

Insertion force of a ball stud into a socket in an automotive headlamp assembly is typically desired to be less than 125N to allow for hand assembly. Prior art ball-sockets are not able to achieve such a low insertion force without sacrificing pull out resistance do to their construction. As a result, the typical insertion force for the prior art ball-sockets (when using a full round plastic ball stud) is around 199N when the socket is made from a polyoxymethylene ("POM") plastic with a relatively flexible tensile modulus of around 1300 MPa.

The ball socket of the present invention 100 does not include middle portions connecting the resilient tabs 130 to the base of the socket. The resilient tabs 130 bend in one direction as a normal cantilevered beam. The resistance to bending in the direction of ball stud insertion is mostly determined by the length and thickness of the resilient tabs 130. Thus, even using a more rigid POM material, e.g., one having a tensile modulus of around 3000 MPa, the ball socket of the present invention 100 achieves an average insertion force (when using a full round plastic ball stud) of around 80N. Once the ball stud is installed, the resilient tabs 130 snap back to the position as shown in FIG. 5 and the upper contact point P2 contacts the ball stud above the previously mentioned tangent point.

Pull-out force is in part determined by the overall diameteral interference between the ball stud 120 outer diameter and the resilient tabs 130 diameter D. Injection molding this interference into prior art ball-sockets require a tool steel undercut. A core pin tool steel forms both these features but the plastic material of the socket 110 must have the elastic ability to stretch over the tool steel upon ejection from the mold in the same manner as the ball stud 120 being pulled out of the socket. Diametral interference is hence limited with prior art ball-sockets due to material elasticity and this undercut method of manufacturing the socket. The available elastic materials generally have lower stiffness and lower strength and this limits the prior art design pull out force. One material used for prior art ball-sockets for example is a POM plastic with a fairly flexible tensile modulus of 1300 MPa. Prior art ball-sockets typical pull out force (for a plastic full round ball stud) with this material is 317N. Some applications in the automotive headlamp field now require above 440N pull out force and the prior art design cannot achieve such a pull-out force resistance with a full round plastic ball stud without making it essentially impossible to insert the ball stud.

The pull out force of a socket 110 in accordance with the present invention is also increased because the resilient tabs 130 need not to be formed using the undercut method of manufacturing. Instead, the desired diameteral interference for pull out may be formed with mating tool steel. A more rigid POM plastic with a higher tensile modulus of 3000 MPa may therefore be used as well as greater interference levels. In testing of prototypes, the average pull out force for a full round plastic ball stud and a socket in accordance with the present invention made with such a material is 700N.

FIGS. 8-9 show two alternative embodiments of the socket 110. In FIG. 8, the socket 110 is secured to a hole 302 in a sheet of material 300 by a plurality of resilient or retention tabs 310 which allow the socket to be snapped into the hole. The retention tabs 310 include cutouts 312 that snap the socket 110 to the material 300. As best seen in FIG. 8D, the retention tabs 310 also serve a function similar to the support legs 140 in the embodiment shown in FIGS. 1-7—they form the cavity in which the ball is disposed when engaged in the socket 110. After the ball stud 120 is inserted, the retention tabs 310 are prevented from further inward movement, further securing the socket 110 to the material 300. In FIG. 9, the socket 110 is secured to its desired location (a hole in a thicker sheet or a boss structure) via a push-in clip 400. Such a clip-retaining feature is shown, for example, in U.S. Pat. No. 7,845,837, the disclosure of which in incorporated herein by reference. Other than the method of securing the socket 110 to a material or hole, the foregoing two embodiments function in the same way as the embodiment in FIGS. 1-7. Of course, other methods for securing the socket 110 can be used without departing from the invention. Further, the socket 110 could also be molded directly as part of another assembly.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A socket adapted to receive a ball stud having a spherical ball, the socket comprising:
a collar; and
resilient tabs attached to and extending radially inward from the collar, the resilient tabs having ends defining an opening for receiving spherical ball, each end comprising:
a journal area extending at an angle relative to a remainder of the resilient tab, the journal area comprising:
a first ball contact surface defining a first hail receiving opening of a diameter D; and
a second bald contact surface, the second ball contact surface being spaced apart from the first ball contact surface, and defining a second ball receiving opening of a diameter greater than the diameter D;
a center adapted to align with the center of the spherical ball;
wherein the journal area has a transition surface between the first ball contact surface and the second ball contract surface; and
wherein the distance from the center to the transition surface is greater than the distance from the center to the first ball contact surface and is greater than the distance from the center to the second ball contact surface.

* * * * *